United States Patent
Tandra Sishtla et al.

(10) Patent No.: US 9,128,579 B2
(45) Date of Patent: Sep. 8, 2015

(54) SOFTWARE LOCALIZATION THROUGH USER CONTRIBUTION

(75) Inventors: Sunil Tandra Sishtla, Bangalore (IN); Anshu Verma, Bangalore (IN); Nemmara S. Chithambaram, Fremont, CA (US); Bharath Kadaba, Santa Monica, CA (US)

(73) Assignee: Intuit Inc., Mountain View, CA (US)

( * ) Notice: Subject to any disclaimer, the term of this patent is extended or adjusted under 35 U.S.C. 154(b) by 460 days.

(21) Appl. No.: 13/523,281

(22) Filed: Jun. 14, 2012

(65) Prior Publication Data

US 2013/0339870 A1 Dec. 19, 2013

(51) Int. Cl.
G06F 3/00 (2006.01)
G06F 3/048 (2013.01)
G06F 17/28 (2006.01)
G06F 3/01 (2006.01)

(52) U.S. Cl.
CPC ............ *G06F 3/048* (2013.01); *G06F 17/2836* (2013.01); *G06F 17/2854* (2013.01)

(58) Field of Classification Search
CPC .. G06F 3/048; G06F 17/2836; G06F 17/2854
USPC ......................................................... 715/744
See application file for complete search history.

(56) References Cited

U.S. PATENT DOCUMENTS

| | | | |
|---|---|---|---|
| 5,944,790 A | 8/1999 | Levy | |
| 7,774,195 B2 * | 8/2010 | Kohlmeier et al. | ............... 704/8 |
| 7,984,151 B1 | 7/2011 | Raz et al. | |
| 8,170,933 B1 | 5/2012 | Cameron et al. | |
| 8,219,907 B2 * | 7/2012 | Kohlmeier et al. | ........... 715/264 |
| 8,489,980 B2 * | 7/2013 | Lakritz | .......................... 715/200 |
| 8,621,416 B1 | 12/2013 | Thomas | |
| 8,631,330 B1 | 1/2014 | Hwang et al. | |
| 2004/0242322 A1 | 12/2004 | Montagna et al. | |
| 2005/0160458 A1 | 7/2005 | Baumgartner | |
| 2006/0123080 A1 | 6/2006 | Baudino et al. | |
| 2006/0143183 A1 | 6/2006 | Goldberg et al. | |
| 2007/0282912 A1 | 12/2007 | Reiner | |
| 2008/0133216 A1 | 6/2008 | Togami | |
| 2009/0112683 A1 | 4/2009 | Hamilton, II et al. | |
| 2009/0234711 A1 | 9/2009 | Ramer et al. | |

(Continued)

OTHER PUBLICATIONS

International Search Report for PCT/US2012/050151, dated Jan. 31, 2013 (5 pages).

(Continued)

*Primary Examiner* — Nicholas Augustine
(74) *Attorney, Agent, or Firm* — Osha Liang LLP

(57) ABSTRACT

A method to adapt a software application for a geographical region. The invention includes receiving, by a computer processor and from at least one of a plurality of users of the software application, a first translation of a localizable item in a user interface (UI) menu of the software application, wherein the first translation is based on a language of the geographical region, generating, by the computer processor, a tally of the first translation from the plurality of users, presenting, to the plurality of users via a plurality of instantiations of the UI menu in response to the tally exceeding a pre-determined count, the localizable item using the first translation, receiving, from the plurality of users via the plurality of instantiations of the UI menu, feedback regarding the accuracy of the first translation, and classifying, based on the feedback, the first translation as an approved translation of the localizable item.

21 Claims, 15 Drawing Sheets

(56) References Cited

U.S. PATENT DOCUMENTS

| | | |
|---|---|---|
| 2010/0058169 A1 | 3/2010 | Demant et al. |
| 2010/0107114 A1* | 4/2010 | Zachcial ................ 715/780 |
| 2011/0144972 A1* | 6/2011 | Koenig .................... 704/2 |
| 2011/0246173 A1 | 10/2011 | Li et al. |
| 2011/0307495 A1* | 12/2011 | Shoshan ................ 707/748 |
| 2012/0141959 A1 | 6/2012 | von Ahn Arellano et al. |
| 2012/0330721 A1 | 12/2012 | Volpe et al. |
| 2013/0060765 A1* | 3/2013 | Lin et al. ................ 707/723 |
| 2013/0238540 A1 | 9/2013 | O'Donoghue et al. |
| 2013/0288212 A1 | 10/2013 | Bist |
| 2014/0201045 A1 | 7/2014 | Pal et al. |

OTHER PUBLICATIONS

Written Opinion for PCT/US2012/050151, dated Jan. 31, 2013 (4 pages).

* cited by examiner

SCREENSHOT A
300a

| ⌂ | Company | Customers | Vendors | Banking | Reports | Sales Tax | | More |
|---|---|---|---|---|---|---|---|---|
| Customer Center | Sales Receipt | Income List | Invoice List | New Invoice | Receive Payment | Statements | | |

Invoice

Recent ▶

Customer: John Smith ▶

Bill To
John Smith

New Charges:

| # | Product/Service | Description |
|---|---|---|
| 1 | ▶ | |
| 2 | ▶ | |
| 3 | ▶ | |
| 4 | ▶ | |

More Lines   Clear All Lines

Customer Message

Add Information such as payment instructions or a message to customers
Messages can be up to 1000 characters in 10 lines

FIG. 3A-1

SCREENSHOT B
300b

| ⌂ | Company | Customers | Vendors | Banking | Reports | Sales Tax |
| | Customer Center | Sales Receipt | Income List | Invoice List | New Invoice | Receive Payment | Statements | More |

Invoice

[Recent ▼]

Customer: [John Smith ▼]

Bill To
[John Smith]

New Charges:
| # | Product/Service | Description |
| 1 | ▼ | |
| 2 | ▼ | |
| 3 | ▼ | |
| 4 | ▼ | |

[More Lines] [Clear All Lines]

Customer Message
[                    ]
Add information such as payment instructions or a message to customers
Messages can be up to 1000 characters in 10 lines

FIG. 3B-1

SCREENSHOT D
300d

| ⌂ | Company | Customers | Vendors | Banking | Reports | Sales Tax | Statements |
|---|---|---|---|---|---|---|---|
| Customer Center | Sales Receipt | Income List | Invoice List | New Invoice | Receive Payment | | More |

Invoice  [Recent ▶]

Customer: [John Smith ▶]

Bill To
[John Smith]

New Charges:

| # | Product/Service | Description |
|---|---|---|
| 1 | ▶ | |
| 2 | ▶ | |
| 3 | ▶ | |
| 4 | ▶ | |

[More Lines]  [Clear All Lines]

Customer Message
[                    ]

Add information such as payment instructions or a message to customers
Messages can be up to 1000 characters in 10 lines

FIG. 3D-1

LIST ALL

FULL REPORT | GRID EDIT | EMAIL▼ | PRINT | OTHER▼

| | CompanyId ▲ | Language | Key Name | Original Text | Translation Text | Is Approved | Translation Complete | Thumbs Up | Thumbs Down |
|---|---|---|---|---|---|---|---|---|---|
| NEW EDIT VIEW | 184767328 | fr_FR | Transactions-Is_terms_invoice_label | Terms | Termes | ✓ | ✓ | 4 | 0 |
| NEW EDIT VIEW | 184767328 | fr_FR | Transactions-Is_terms_invoice_label | Terms | Teermes | | | 0 | 2 |
| TOT | | | | | | | | 4 | 2 |

Results 1 to 2 (out of 2)

DATA RECORD F
300f

FIG. 3F

SOFTWARE LOCALIZATION THROUGH USER CONTRIBUTION

BACKGROUND

In computing, the terms "internationalization" and "localization" refer to adapting computer software to different languages, regional differences and technical requirements of a target market. Internationalization is the process of designing a software application so that the application can be adapted to various languages and regions without substantial engineering changes. Localization is the process of adapting internationalized software for a specific region or language by adding locale-specific components and translating text based on a language specific to the region.

SUMMARY

In general, in one aspect, the invention relates to a method to adapt a software application for a geographical region. The invention includes receiving, by a computer processor and from at least one of a plurality of users of the software application, a first translation of a localizable item in a user interface (UI) menu of the software application, wherein the first translation is based on a language of the geographical region, generating, by the computer processor, a tally of the first translation from the plurality of users, presenting, to the plurality of users via a plurality of instantiations of the UI menu in response to the tally exceeding a pre-determined count, the localizable item using the first translation, receiving, from the plurality of users via the plurality of instantiations of the UI menu, feedback regarding the accuracy of the first translation, and classifying, based on the feedback, the first translation as an approved translation of the localizable item.

In general, in one aspect, the invention relates to a system to adapt a software application for a geographical region. The system includes a computer processor configured to receive, from at least one of a plurality of users of the software application, a first translation of a localizable item in a user interface (UI) menu of the software application, wherein the first translation is based on a language of the geographical region, generate a tally of the first translation from the plurality of users, and classify, based on feedback of the plurality of users, the first translation as an approved translation of the localizable item, a plurality of user devices configured to display a plurality of instantiations of the UI menu for the plurality of users, present, to the plurality of users via the plurality of instantiations of the UI menu in response to the tally exceeding a pre-determined count, the localizable item using the first translation, receive, from the plurality of users via the plurality of instantiations of the UI menu, the feedback regarding the first translation, and a repository configured to store the first translation and the feedback.

In general, in one aspect, the invention relates to a non-transitory computer readable medium storing instructions to adapt a software application for a geographical region. The instructions, when executed by a computer processor, include functionality for receiving, from at least one of a plurality of users of the software application, a first translation of a localizable item in a user interface (UI) menu of the software application, wherein the first translation is based on a language of the geographical region, generating a tally of the first translation from the plurality of users, presenting, to the plurality of users via a plurality of instantiations of the UI menu in response to the tally exceeding a pre-determined count, the localizable item using the first translation, receiving, from the plurality of users via the plurality of instantiations of the UI menu, feedback regarding the accuracy of the first translation, and classifying, based on the feedback, the first translation as an approved translation of the localizable item.

Other aspects of the invention will be apparent from the following detailed description and the appended claims.

BRIEF DESCRIPTION OF DRAWINGS

FIGS. 3A-1, 3A-2, 3B-1, 3B-2, 3C, 3D-1, 3D-2, 3E-1, 3E-2, 3F, 3G-1, and 3G-2 show an example of adaptive user retention in accordance with one or more embodiments of the invention.

DETAILED DESCRIPTION

Figure 1:
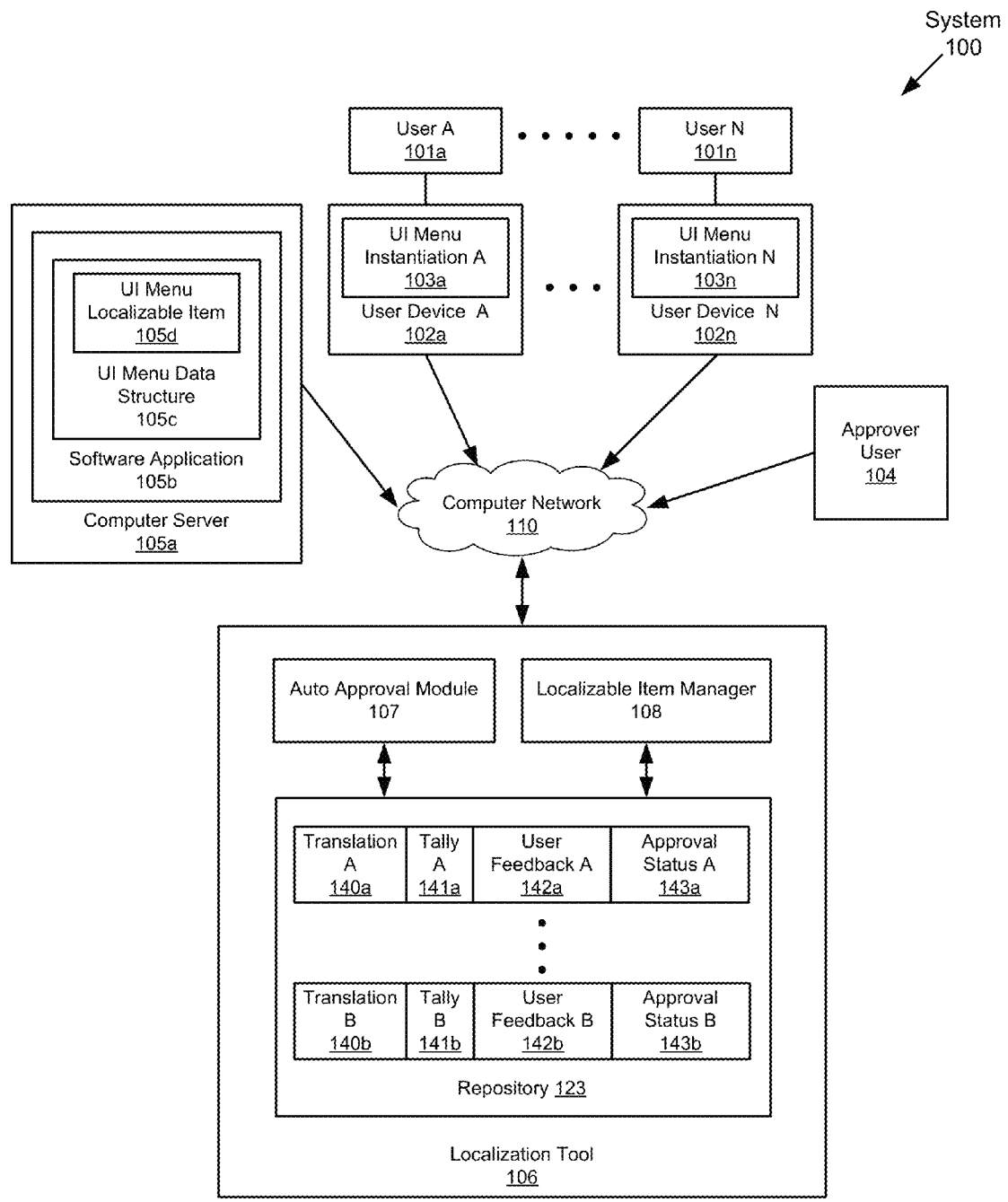
FIG. 1 shows a schematic diagram of a system of adaptive user retention in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Embodiments of the invention allow the users of a software application to provide, in a live interaction with the software application, suggestions (e.g., text translation or other locale-specific components) to localizable items of the software application. The users may also approve, also in a live interaction with the software application, existing translations (e.g., built-in default or suggested by other users) by voting or submitting alternate suggestions. In particular, the live interaction and immediate visual feedback of the suggestion across a community of users drives engagement and contribution from users within a community. This further allows for users in different regions using the software application to directly localize the software application without developer or administrator intervention.

FIG. 1 depicts a schematic block diagram of a system (100) in accordance with one or more embodiments of the invention. In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1.

As shown in FIG. 1, the system (100) includes a computer server (105a) executing a software application (105b) that includes a user interface (UI) menu data structure (105c) storing a UI menu localizable item (105d). The software application (105b) may be an accounting software, a financial software, a web service, or any other online software product. The software application may also be a desktop application/product. In addition, users (e.g., user A (101a), user N (101n), approver user (104), etc.) access the software application (105b) using respective user devices (e.g., user device A (102a), user device N (102n), etc.). The users (e.g., user A (101a), user N (101n), approver user (104), etc.) may be members of a user group (e.g., accountants working for an accounting firm) who jointly contribute to localization of the software application (105b) such that the resultant localized version of the software application (105b) is shared within the user group.

In one or more embodiments, the software application (105b) is a web based application such that each user (e.g., user A (101a), user N (101n), etc,) interacts with the software application (105b) via an instantiation of one or more UI menu (i.e., UI window) of the software application (105b). For example, UI menu instantiation A (103a) and UI menu instantiation N (103n) are displayed using web browsers on user device A (102a) and user device N (102n), respectively. In one or more embodiments, an instantiation (not shown) of the software application (105b) is downloaded onto each user device (e.g., user device A (102a), user device N (102n), etc.) where each user (e.g., user A (101a), user N (101n), etc,) interacts with the downloaded instantiation (not shown) of the software application (105b) via the UI menu (e.g., UI menu instantiation A (103a), UI menu instantiation N (103n), etc.).

Further as shown in FIG. 1, the system (100) includes a localization tool (106) having an auto approval module (107), localizable item manager (108), and a repository (123) storing user feedback. The repository (123) may include a disk drive storage device, a semiconductor storage device, other suitable computer data storage device, or combinations thereof. Various components of the system (100) are coupled via a computer network (110). For example, the computer network (110) may include wired and/or wireless portions of public and/or private data network, such as wide area networks (WANs), local area networks (LANs), Internet, etc. In one or more embodiments of the invention, the repository (123) may be thought of as a translation warehouse configured to store suggested translations, tallies, user feedback, and approval status for each translation of each localizable UI menu item on the UI menu of the software application.

In one or more embodiments of the invention, the software application (105b) includes the UI menu data structure (105c) storing locale-specific objects of the UI menu structures. In one or more embodiments of the invention, the UI menu data structure (105c) may be the Java™ ResourceBundle typically coupled to online products and known to those skilled in the art. In one or more embodiments, the UI menu data structure (105c) stores the UI menu localizable item (105d), which is an element of a UI menu (i.e., UI window) subject to localization based on the geographical region where the user resides. In one or more embodiments, localization of the UI menu localizable item (105d) includes text translation based on the prevailing language used in the geographical region of the users using the software application, as well as other locale-specific conversions. These locale-specific conversions are applicable to telephone numbers, addresses and international postal codes, currency (e.g., symbols, positions of currency markers), weights and measures, printing paper sizes, writing conventions, date/time format, different calendars, time zones, formatting of numbers (e.g., decimal separator, digit grouping), differences in symbols (e.g., quoting text using double-quotes (" "), as in English, or guillemets (<< >>), as in French), government assigned numbers (e.g., the Social Security number in the U.S., National Insurance number in the UK, Isikukood in Estonia, and Resident registration number in South Korea), culturally related images and colors, names and titles, disputed borders shown on maps, etc.

In one or more embodiments, the localization tool (106) includes the auto approval module (107) and the localizable item manager (108), which are software modules executing on a computer processor (not shown) to adapt the software application (105b) for a geographical region (i.e., a locale). In one or more embodiments, the geographical region is user selected. For example, a group of users may select a single geographical region to localize the software application (105b) at any single time. In another example, the group of users may submit translation suggestions to localize the software application (105b) for multiple geographical regions in parallel. Alternatively, individual users may submit translation suggestions in one or more languages.

In one or more embodiments, the auto approval module (107) is configured to receive, from at least one of the users (e.g., user A (101a)) a translation (e.g., translation A (140a) of a localizable item (e.g., UI menu localizable item (105d)) in a user interface (UI) menu. For example, an instantiation of the UI menu (i.e., UI menu instantiation A (103a)) is presented on the user device A (102a). As noted above, the software application (105b) may be an online application where the UI menu instantiation A (103a) is displayed in a web browser (not shown) executing on the user device A (102a). Alternatively, the user device A (102a) may execute a downloaded copy of the software application (105b), which presents the UI menu instantiation A (103a) on the user device A (102a). In one or more embodiments, the user A (101a) submits the translation A (140a) via the UI menu instantiation A (103a). Specifically, the UI menu includes a translation input field displayed within the UI menu instantiation A (103a) for a particular localizable item of the UI. Accordingly, the translation A (140a) is received from the user A (101a) via the translation input field presented in the UI menu instantiation A (103a). In a similar manner, multiple users may submit multiple translations for the UI menu localizable item (105d) via respective UI menu instantiations.

In one or more embodiments, the auto approval module (107) is configured to generate a tally (e.g., tally A (141a), tally B (141b), etc.) of the number of user submitted translations (e.g., translation A (140a), translation B (140b), etc.). For example, when three users submit the same translation A (140a) for the UI menu localizable item (105d), the tally A (141a) is three. In one or more embodiments, in response to the tally of a particular translation exceeding a pre-determined count, the localizable item is presented to the users in respective UI menu instantiations using the particular translation. In the above example, if the tally A (141a) is three and the pre-determined count is set at two, the translation A (140a) is used to represent the UI menu localizable item (105d) in the UI menu instantiation A (103a) and UI menu instantiation N (103n), among other UI menu instantiations. Those skilled in the art will appreciate that when user A and user N are not in the same geographical region or are interested in translations in distinct languages, the UI menu localizable item (105d) may be presented in only one of the UI menu instantiations.

In one or more embodiments, the auto approval module (107) is configured to receive, from via the UI menu instantiations (i.e., UI menu instantiation N (103n)), user feedback regarding the translation (e.g., translation A (140a)) of a UI menu localizable item (e.g., UI menu localizable item (105d)). For example, the feedback from each user may be a binary vote (e.g., yes, no, thumb-up, thumb-down, OK, no-go, etc.), a score (e.g., on a scale of 0 to 10 representing a level of agreement), or any other suitable feedback format. For example, the user feedback A (142a) may include a vote from each of user A (101a), user N (101n), etc. who has submitted feedback regarding the translation A (140a) via the UI menu instantiation A (103a), UI menu instantiation N (103n), etc., respectively. As previously described, the translation A (140*a*) may have been submitted by the user A (101*a*). In a different example, the translation A (140*a*) may also be a default translation included in the software application (105*b*).

In one or more embodiments, the auto approval module (107) is configured to classify, based on user feedback (e.g., user feedback A (142*a*)), the translation (e.g., translation A (140*a*)) as an approved translation of the localizable item (e.g., UI menu localizable item (105*d*)). For example, the classification may require an average score calculated from the user feedback (e.g., user feedback A (142*a*)) to exceed a pre-determined minimum score or threshold. In another example, the classification may require that the positive vote exceeds the negative vote by a pre-determined minimum margin (e.g., 3-to-1, 10-to-2, etc.). In one or more embodiments, the classification may be based on the feedback of a user (e.g., approver user (104)) who has a designated status as having localization approval authority.

For example, the approver user (104) may unilaterally approve the translation A (140*a*) as the approved translation for the UI menu localizable item (105*d*). In another example, the user feedback A (142*a*) may be presented to the approver user (104) who reviews the average score, voting margin, or other statistics of the user feedback to determine whether the translation is classified as the approved translation for the UI menu localizable item (105*d*). In other words, the auto approval module (107) may classify the translation (e.g., translation A (140*a*)) as an approved translation based on feedbacks (e.g., user feedback A (142*a*)) of the users (e.g., user A (101*a*), user N (101*n*), etc.) as well as input from the approver user (104). Those skilled in the art will appreciate that in the interim before a translation is classified as "approved," the translation may be classified as "unapproved" or "suggested." The translation may then be re-classified as an approved translation after a particular threshold related to user feedback is met.

In one or more embodiments, the auto approval module (107) is configured to present, via the UI menu instantiations displayed on the user devices, the localizable item using multiple translations to solicit user feedbacks. For example, both the translation A (140*a*) and the translation B (140*b*) may have been submitted by multiple users for the UI menu localizable item (105*d*). In particular, both tally A (141*a*) and tally B (141*b*) meet the requirement to qualify as approval candidates to be presented to users for approval solicitation. Specifically, both the translation A (140*a*) and the translation B (140*b*) are presented in each of the UI menu instantiation A (103*a*), UI menu instantiation N (103*n*), etc. to solicit feedback from user A (101*a*), user N (101*n*), etc. Similar to the user feedback A (142*a*) described above, the additional user feedback B (142*b*) regarding using translation B (140*b*) to localize the UI menu localizable item (105*d*) may include a vote from each of user A (101*a*), user N (101*n*), etc. who submit feedback regarding the translation B (140*b*) via the UI menu instantiation, A (103*a*), UI menu instantiation N (103*n*), etc., respectively.

In one or more embodiments, the auto approval module (107) is configured to analyze the user feedback A (142*a*) and the user feedback B (142*b*) to determine a level of agreement by the users regarding which is the appropriate translation. For example, the auto approval module (107) may calculate an average score, a tally of positive vote, a tally of negative vote, or other voting statistics based on the user feedback A (142*a*) to represent the level of agreement by the users regarding using the translation A (140*a*) to localize the UI menu localizable item (105*d*). In a similar fashion, the auto approval module (107) may calculate an average score, a tally of positive vote, a tally of negative vote, or other voting statistics based on the user feedback B (142*b*) to represent the level of agreement by the users regarding using the translation B (140*b*) to localize the UI menu localizable item (105*d*). In one or more embodiments, classifying the translation requires comparing the level of agreement derived from the user feedback A (142*a*) and the level of agreement derived from the user feedback B (142*b*). For example, translation A (142*a*) may be classified as the approved translation based at least on having a higher level of agreement by the users.

In one or more embodiments, the localization tool (106) includes the localization item manager (108) that is configured to release approved translations to the software application (105*b*) by monitoring approval status of UI menu localizable items. For example, the localization item manager (108) may periodically scan the approval status A (143*a*), the approval status B (143*b*), etc. while users submit translation suggestions to the auto approval module (107) periodically. When the translation A (140*a*) is initially registered by the auto approval module (107), there may not have been sufficient information in the user feedback A (142*a*) to allow the auto approval module (107) to complete an approval classification. For example, there may not have been enough users who have provided their feedback regarding the translation A (140*a*) to establish the aforementioned required voting margin. In this case, translation A (140*a*) may be classified as unapproved by default. Further, as the auto approval module (107) approves (i.e., classifies as approved) a partial portion of all localizable items in one UI menu, the localization item manager (108) monitors the completion status of each UI menu or a set of related UI menus. When all localizable items in the entire UI menu (or the entire related set of UI menus) are approved, the localization item manager (108) releases them as a set to the software application (105*b*).

In one or more embodiments, the UI menu data structure (105*c*) is updated based on the released translations. That is, released translations may be stored in the UI menu data structure (105*c*). For example, any UI menu instantiation (e.g., UI menu instantiation A (103*a*), UI menu instantiation N (103*n*), etc.) displayed in the browser may be updated dynamically based on the updated UI menu data structure (105*c*). In another example, any future downloading of the software application (105*b*) onto user devices (e.g., user device A (102*a*), user device N (102*n*), etc.) includes the released translations based on the updated UI menu data structure (105*c*).

Figure 2:
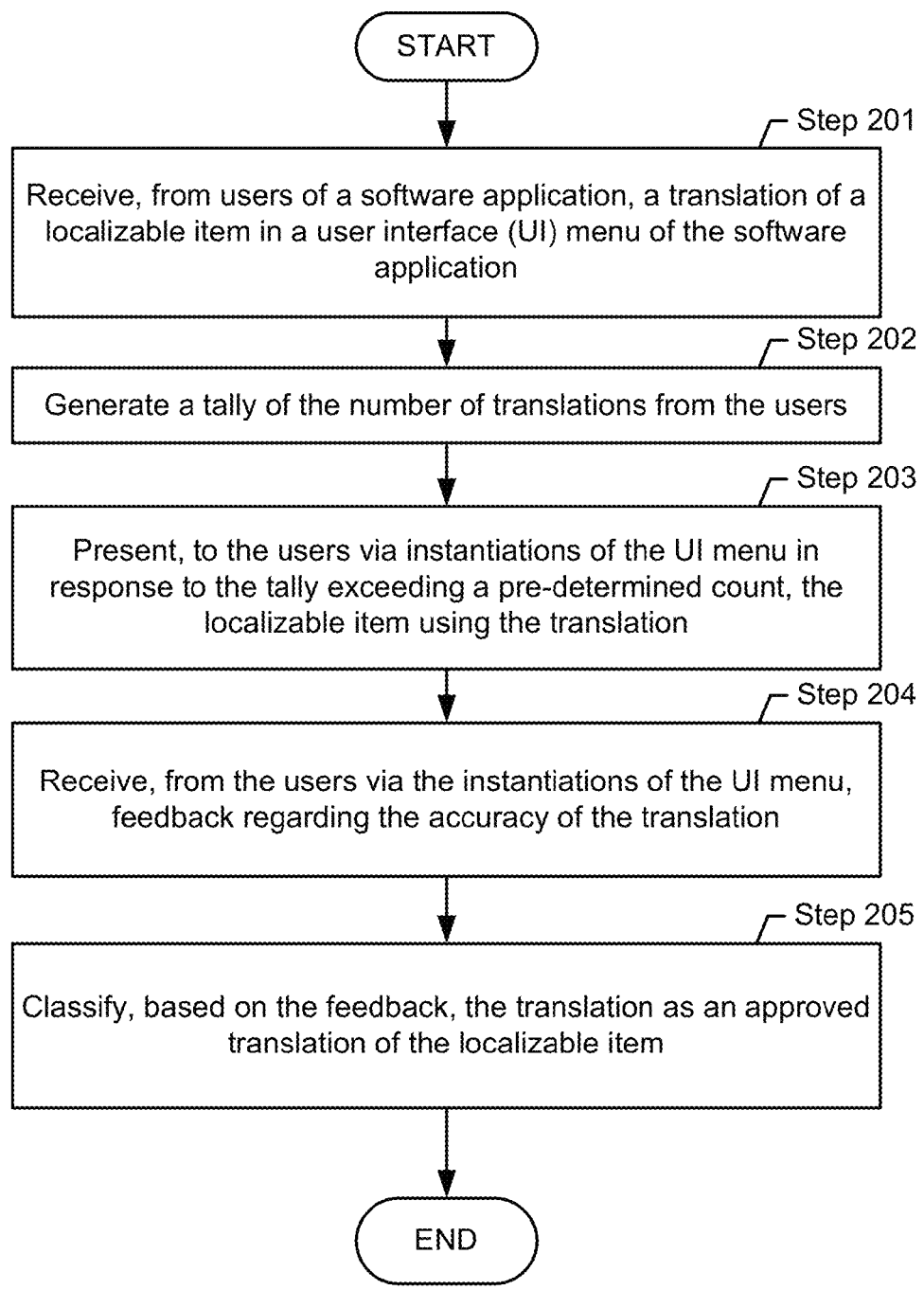
FIG. 2 shows a flowchart of a method of adaptive user retention in accordance in accordance with one or more embodiments of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments, the method described in reference to FIG. 2 may be practiced using the system (100), in particular the master merchant computer system (120) described in reference to FIG. 1 above.

Initially in Step 201, a translation of a localizable item in a user interface (UI) menu of a software application is received by a computer processor and from at least one of the users of the software application. In particular, the translation is based on a language of a geographical region, as specified by the users when submitting the translation. Alternatively, the geographical region of the user may be obtained automatically by the software application based on the user's current location, the user device's IP address, or any other global positioning means that may be employed to determine the user's geographic region. In one or more embodiments, the translation is received via a translation input field in the UI menu. Specifically, the translation is received from the user via the translation input field presented in an instantiation of the UI menu displayed on a user device. For example, the user may activate a translation input mode of the software application. When the translation input mode is activated, each localizable item in the UI menu is displayed along with the translation input field for accepting user input of a suggested translation. In one or more embodiments, a message is also displayed to invite the user to provide his/her translation suggestion for localizing the software application. Multiple users may submit suggested translations regarding a single UI menu localizable item. These multiple suggested translations may include duplications representing popular choices of translation. In one or more embodiments, these user-suggested translations are stored and analyzed.

In Step 202, a tally of the number of user submitted translations for each localizable item is generated. For example, if three users submitted the same translation for one or more localizable items, the tally equals three. In general, the more popular a translation is, the higher the tally will be. Further, an incorrect translation, a translation that is not appropriate, or a translation that includes a typographical error tends to have a lower tally. Such lower tally translations may also be flagged or marked by users as inaccurate in the translation input field or elsewhere in the UI menu.

In Step 203, in response to the tally exceeding a pre-determined count, the translation of the localizable item is presented to the users for their feedback. The pre-determined count may be a default threshold, an administrator or developer defined threshold, or a user-defined threshold. Specifically, the localizable item is presented using the translation in each instantiation of the UI menu that is displayed on respective user devices. Said in other words, the localizable item in the UI menu is displayed to each user along with the suggested translation whose tally exceeds the pre-determined count. In one or more embodiments, a message is also displayed to invite each user to provide his/her feedback regarding using the suggested translation as an approved translation to localize the software application. In one or more embodiments, more than one translation suggestion may be presented for a single localizable item. For example, multiple suggested translations may have tallies that exceed the pre-determined count. Accordingly, multiple approval candidates are presented for user selection to approve.

In Step 204, feedback regarding the accuracy of the translation is received from the users via respective instantiations of the UI menu that are displayed on respective user devices. For example, the feedback from each user may be a binary vote (e.g., yes, no, thumb-up, thumb-down, OK, no-go, etc.), a score (e.g., on a scale of 0 to 10 or A to Z representing a level of agreement), or in other feedback formats.

In Step 205, the translation is classified, based on the feedback, as an approved translation of the localizable item. For example, the classification may require an average score calculated from the user feedbacks (e.g., user feedback A (142a)) to exceed a pre-determined minimum score. In another example, the classification may require the positive vote exceeds the negative vote by a pre-determined minimum margin (e.g., 3-to-1, 10-to-2, etc.). In one or more embodiments, a level of agreement by the users for each translation is determined by analyzing the feedback. For example, the average score, the voting margin, or other feedback statistics may be used to represent the level of agreement. In one or more embodiments, the classification is based on comparing the level of agreement for each translation to one another. For example, the translation having the highest level of agreement by the users is selected as the approved translation.

In one or more embodiments, the classification may be based on the feedback of an approver user who has a designated status of having localization approval authority. For example, the approver user may unilaterally approve the translation as the approved translation for the UI menu localizable item. In another example, the user feedback may be presented to the approver user who reviews the average score, voting margin, or other statistics of the user feedback to determine whether the translation is classified as the approved.

FIGS. 3A-1, 3A-2, 3B-1, 3B-2, 3C, 3D-1, 3D-2, 3E-1, 3E-2, 3F, 3G-1, and 3G-2 show an application example in accordance with one or more embodiments of the invention. This application example may be practiced using the system (100) of FIG. 1 and based on the method described with respect to FIG. 2 above.

Figures 2, 3A:
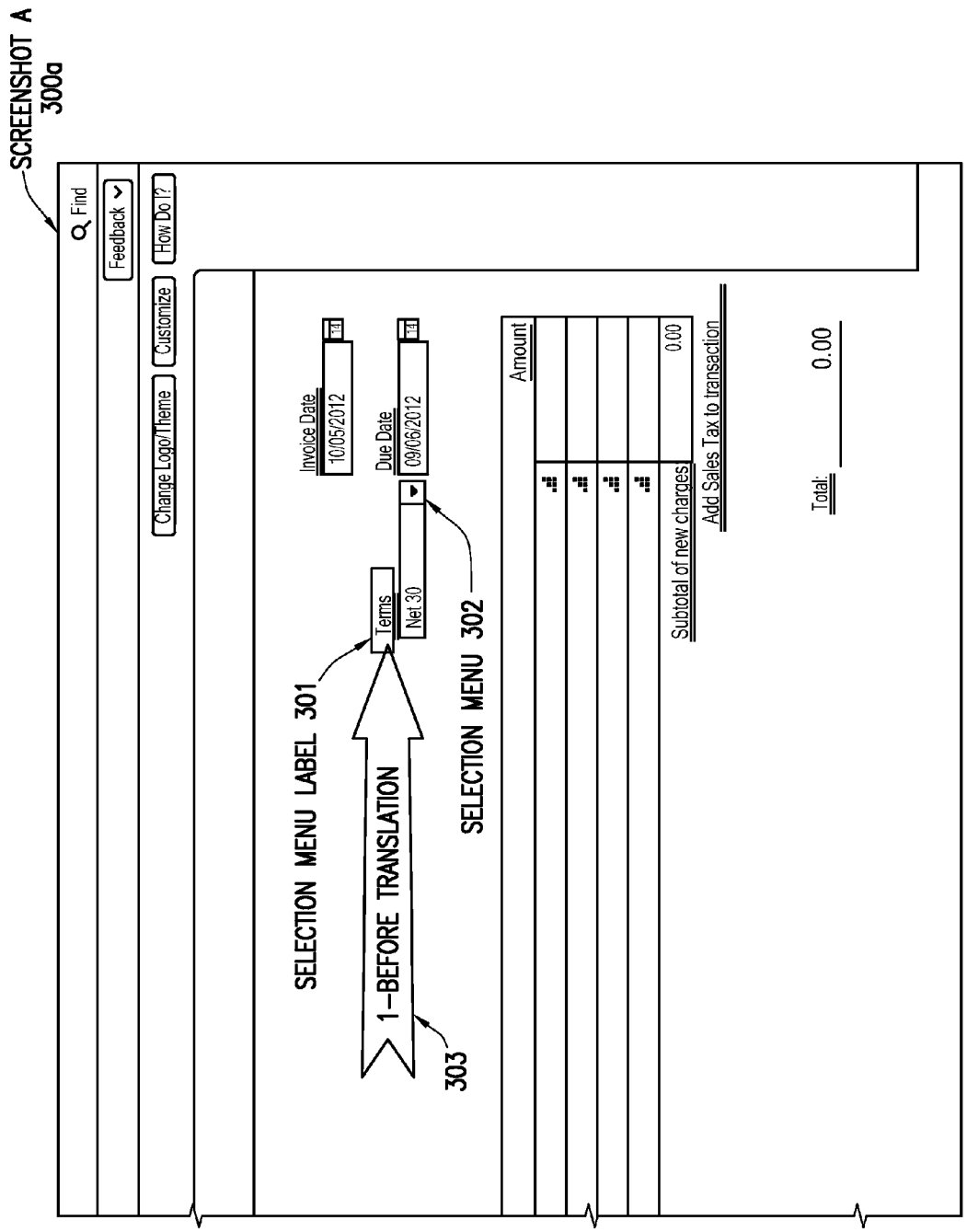

FIGS. 3A-1 and 3A-2 show a screenshot A (300a) of a UI menu of a web-based software application. For example, the screenshot A (300a) may be captured from a first browser window displaying the UI menu (i.e., a first instantiation thereof) on a first user device. In particular, this UI menu is for an accountant user A to prepare an invoice. As shown in FIGS. 3A-1 and 3A-2, the screenshot A (300a) includes various data entry fields and selection menus. In general, data entry field labels and menu selection content are localizable items. For example, the selection menu label (301) for the drop down selection menu (302) is a localizable item. Specifically, the arrow (303) (for illustration only, not part of the screenshot A (300a)) points out that the selection menu label (301) reads "terms" before translation.

Figures 2, 3B:
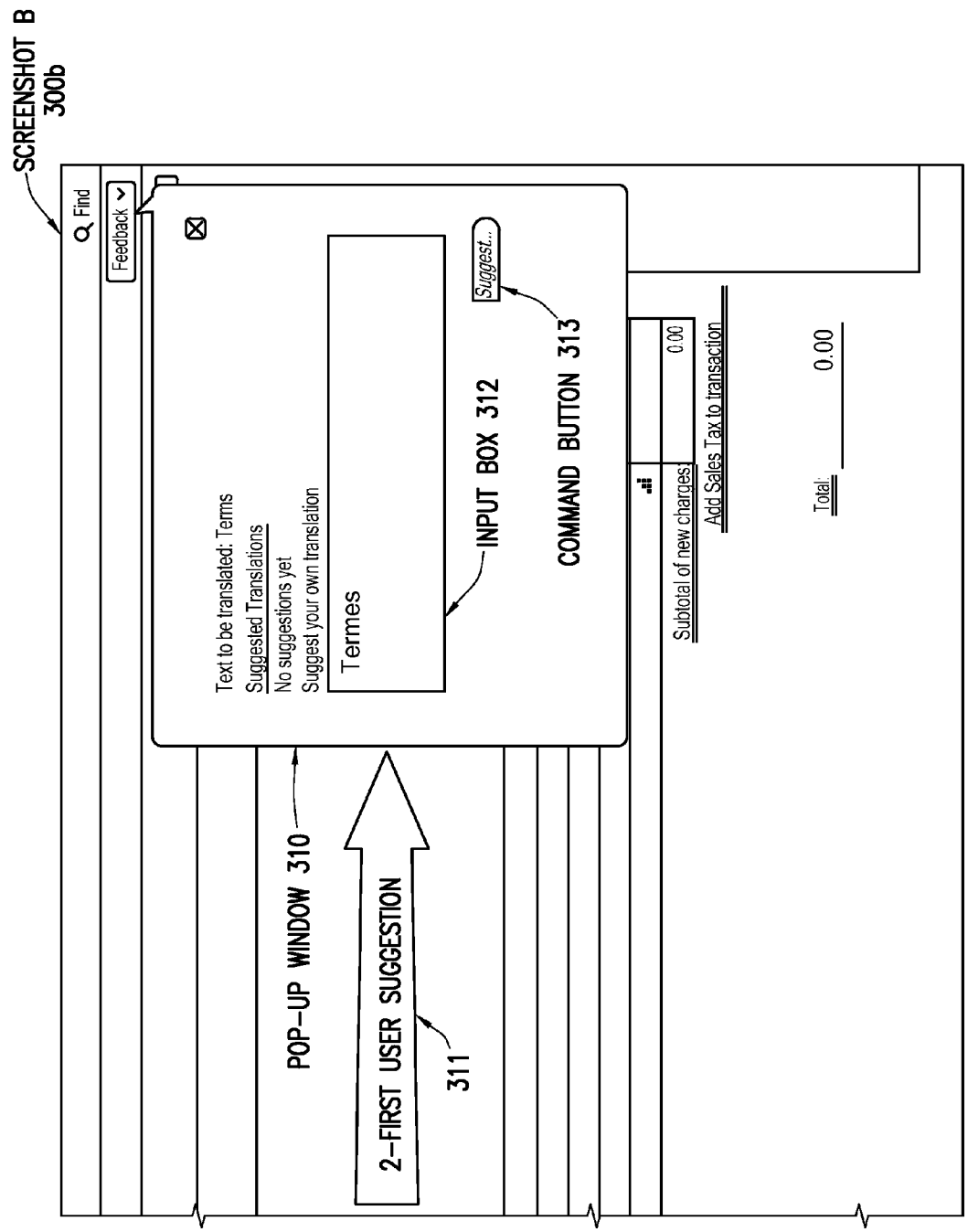

FIGS. 3B-1 and 3B-2 show a screenshot B (300b) of the same UI menu depicted in FIGS. 3A-1 and 3A-2. In particular, this UI menu is ready for accepting a French translation from the user A. For example, the user A has activated the French translation input mode of the software application and selected the selection menu label (301) to display the pop-up window (310). As shown in FIGS. 3B-1 and 3B-2, the pop-up window (310) overlaps and hides the selection menu label (301), and includes a message inviting the user A to suggest a translation of the text "terms" using the input box (312). Specifically, the arrow (311) (for illustration only, not part of the screenshot B (300b)) points out that the user A has entered a translation suggestion into the input box (312), which reads "termes." The user A then clicks the command button (313) "suggest" to submit the suggested translation to the backend localization tool. For example, the backend localization tool is described in reference to FIG. 1 above. Those skilled in the art will appreciate that the translation suggestion may be in any language, and that the localization tool provides for all types of alphabets, numbers, characters, symbols, accents, etc. corresponding to world geographic regions and world languages. Further, although not shown in the example screen shots, the user suggesting a translation may choose a particular language that the translation corresponds to in the UI input box (312) or drop-down menu or other legend that may be displayed anywhere on the UI instance.

Figure 3C:
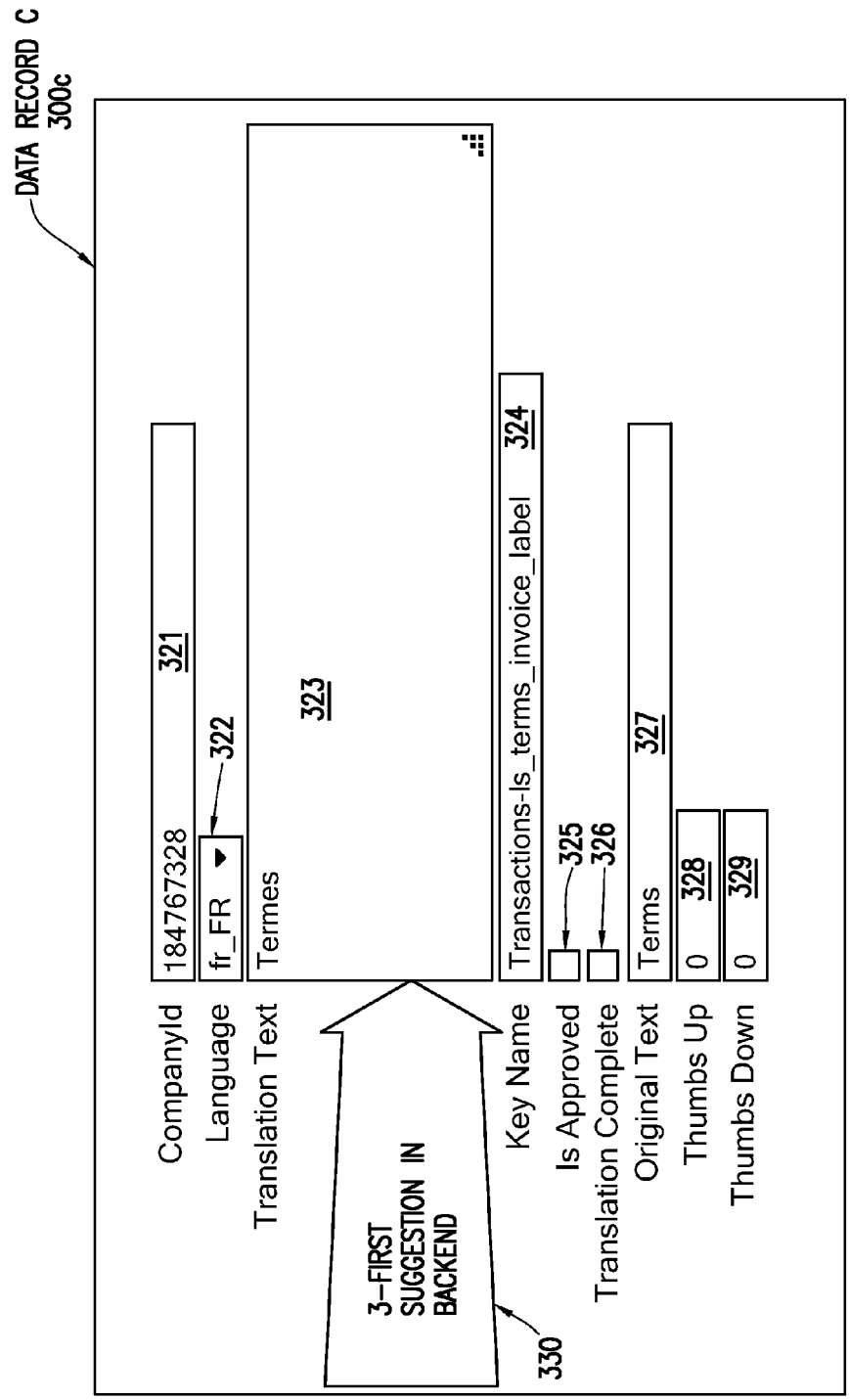

FIG. 3C shows a data record C (300c) of the localizable item corresponding to the selection menu label (301). For example, the data record C (300c) is maintained on the backend localization tool described in reference to FIG. 1 above. In particular, the data record C (300c) includes an identifier (321) for the accounting firm for which the user A is an employee, a locale selector (322), user suggested translations (323), a localizable item identifier (324), approval status (325), completion status (326), original text (327), positive voting tally (328), and negative voting tally (329).

Based on the locale selector (322), the data record C (300c) is used to keep track of user suggested translations for multiple languages/locales. Specifically, the arrow (330) (for illustration only, not part of the data record C (300c)) points out that the first user suggested French translation of the selection menu label (301) is registered in the data record C (300c) as "termes." As shown in FIGS. 3B-1 and 3B-2 above, this translation was submitted by the user A. In addition, approval status (325) indicates whether a user suggested translation has been accepted as the correct translation, whereas completion status (326) means indicates whether an accepted translation has been applied within the software application.

Figures 2, 3D:
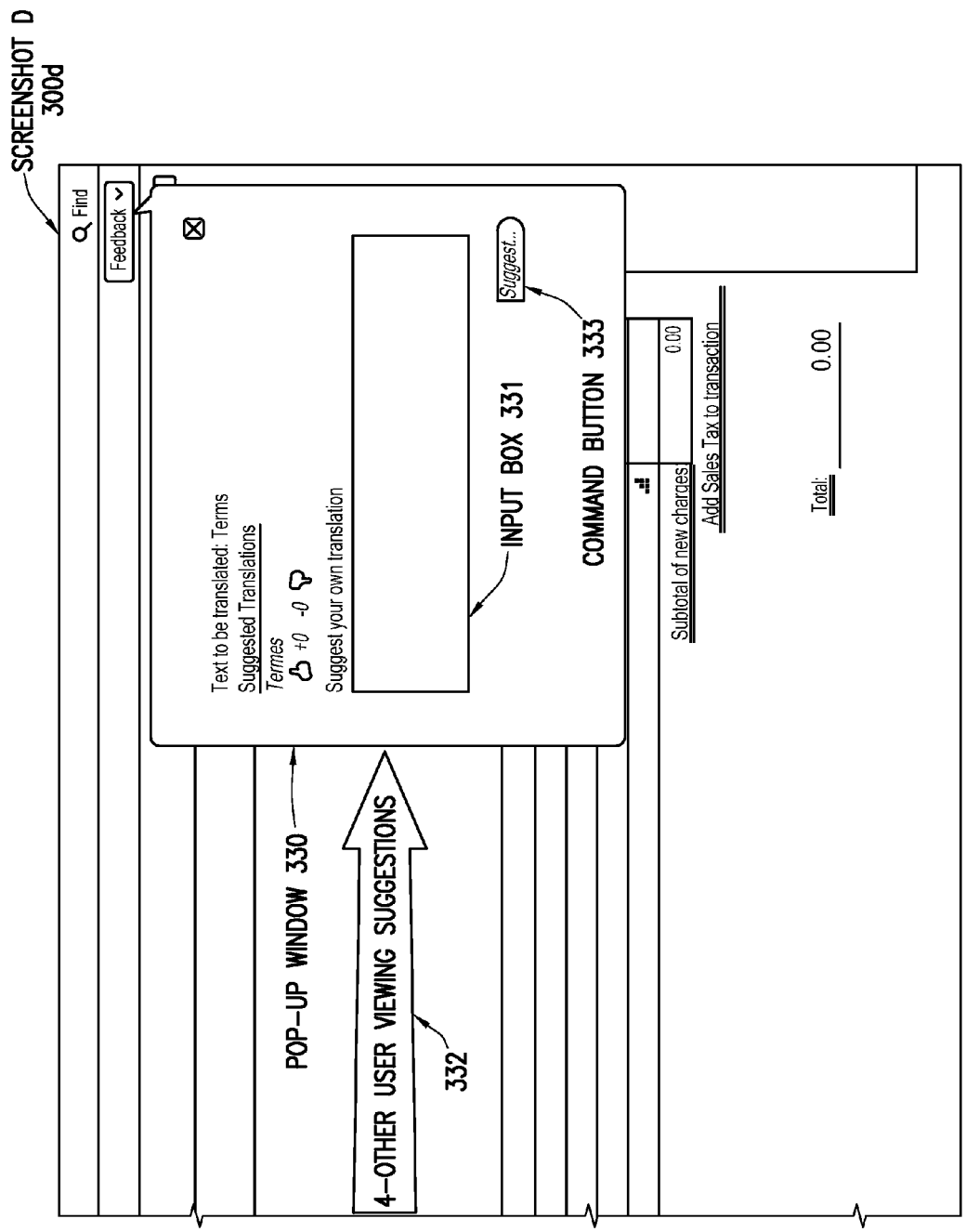

FIGS. 3D-1 and 3D-2 show a screenshot D (300d) of the same UI menu depicted in FIGS. 3A-1, 3A-2, 3B-1, and 3B-2, but for a different user. For example, the screenshot D (300d) may be captured from a second browser window displaying the UI menu (i.e., a second instantiation thereof) on a second user device of a user B. Specifically, the user B has activated the French translation input mode of the software application and selected the selection menu label (301) to display the pop-up window (330). As shown in FIGS. 3D-1 and 3D-2, the pop-up window (330) overlaps and hides the selection menu label (301), and includes a message inviting the user B to vote on the previously submitted translation "termes" or to suggest an alternative translation using the input box (331). Specifically, the arrow (332) (for illustration only, not part of the screenshot D (300d)) points out that the user B has entered a translation suggestion into the input box (331), which reads "teermes." The user B then clicks the command button (333) "suggest" to submit the suggested translation to the backend localization tool.

Figures 1, 3E:
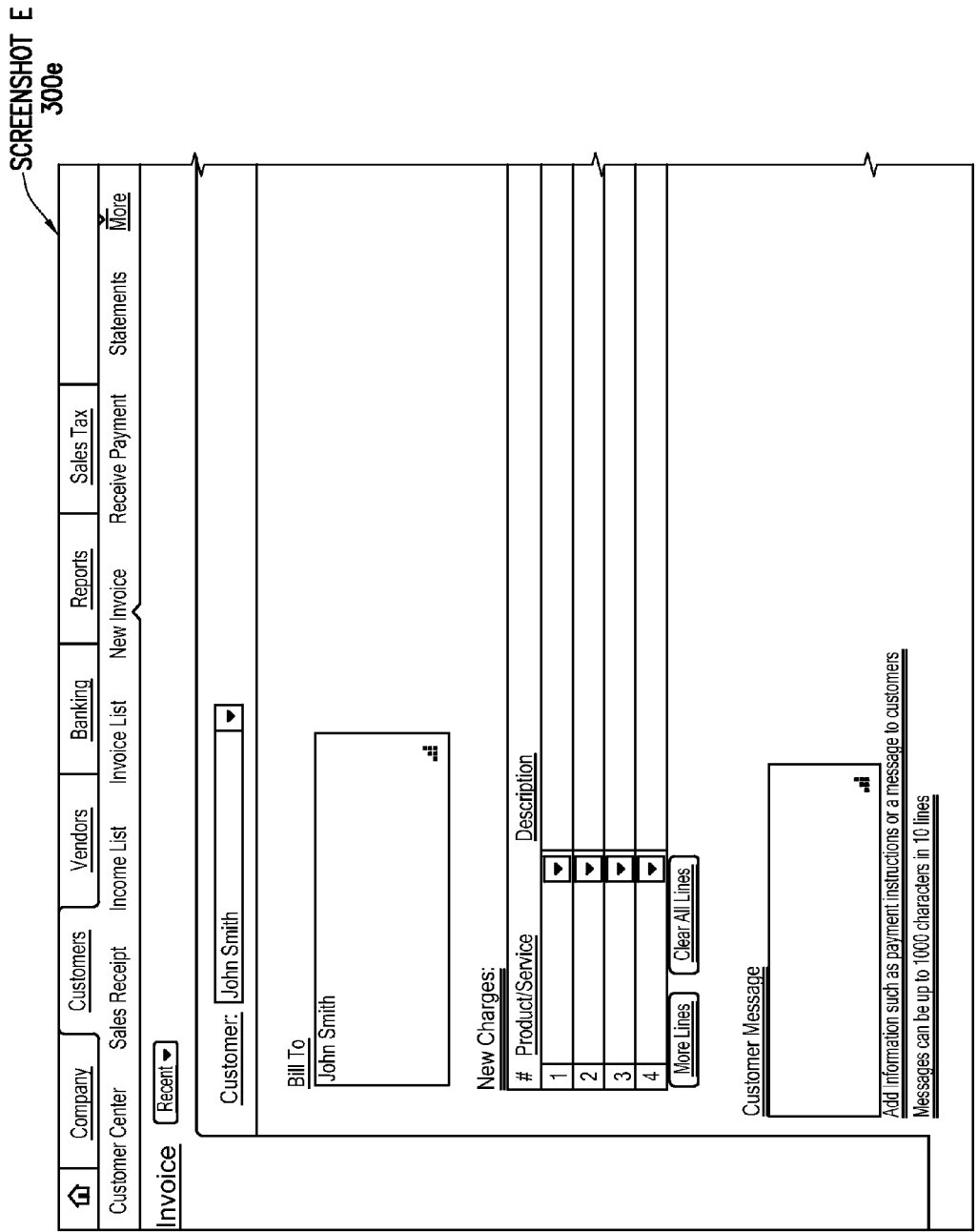
Figures 2, 3E:
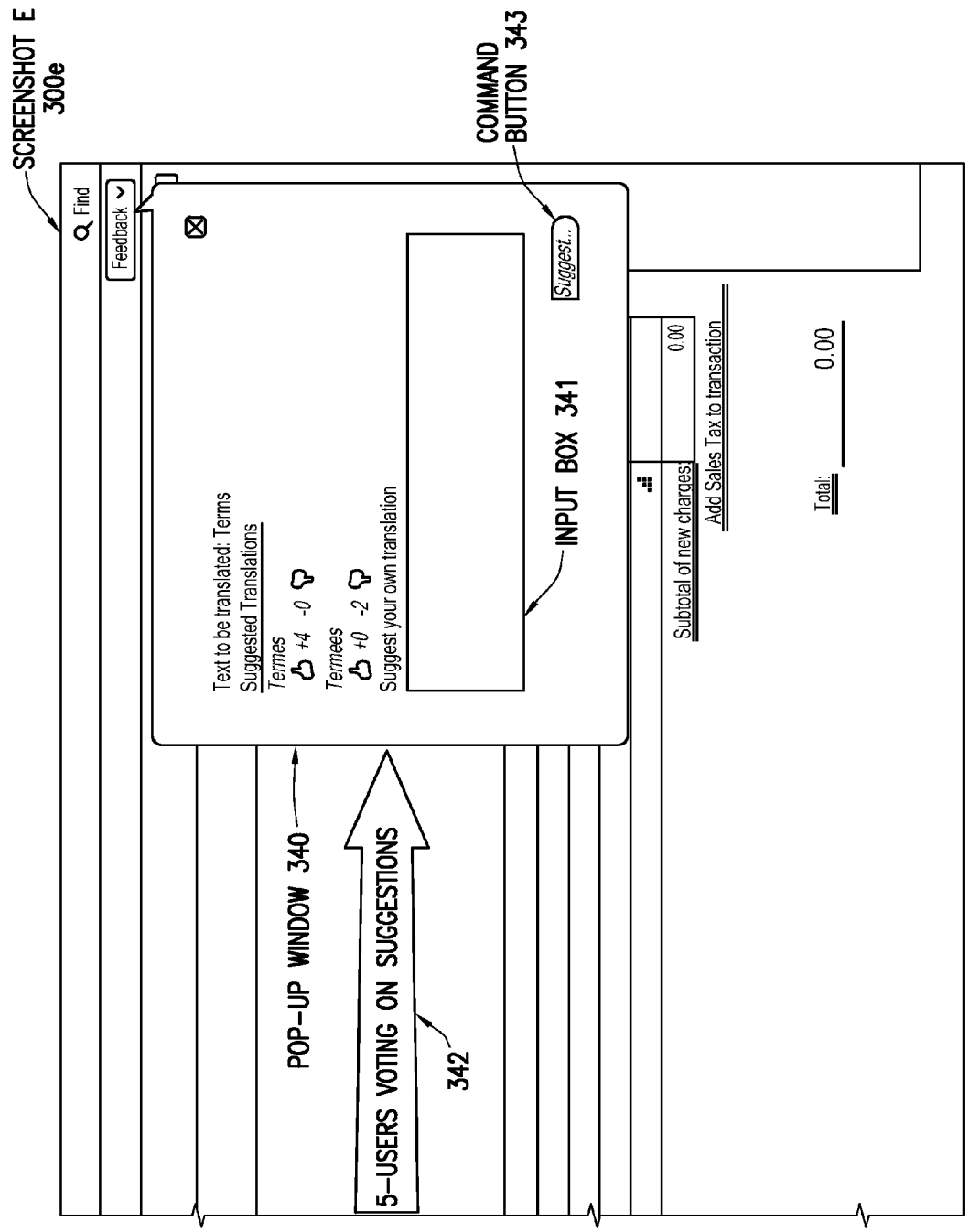

FIGS. 3E-1 and 3E-2 shows a screenshot E (300e) of the same UI menu depicted in FIGS. 3A-1, 3A-2, 3B-1, 3B-2, 3D-1, and 3D-2, but for yet another user. For example, the screenshot E (300e) may be captured from a third browser window displaying the UI menu (i.e., a third instantiation thereof) on a third user device of a user C. Specifically, the user C has activated the French translation input mode of the software application and selected the selection menu label (301) to display the pop-up window (340). As shown in FIGS. 3E-1 and 3E-2, the pop-up window (340) overlaps and hides the selection menu label (301), and includes a message inviting the user C to vote on the previously submitted translations "termes" and "teermes" or to suggest an alternative translation using the input box (341). Specifically, the arrow (342) (for illustration only, not part of the screenshot E (300e)) points out that the user C chooses not to enter a translation suggestion into the input box (341), but instead voted yes for the first translation suggestion "termes" and voted no for the second translation suggestion "teermes." For example, the user C may click on the thumbs-up and/or the thumbs-down icons to cast the vote(s). As shown in FIGS. 3E-1 and 3E-2, the cumulative votes, including from the user C, are 4 positive votes for the first translation suggestion "termes" and two negative votes for the second translation suggestion "teermes." The user B then clicks the command button (343) "suggest" to submit the votes to the backend localization tool.

FIG. 3F shows a data record (300f) of the localizable item corresponding to the selection menu label (301). For example, the data record (300f) is maintained on the backend localization tool and is a variation of the data record C (300c) depicted in FIG. 3C above. In particular, the data record (300f) includes two row entries of the first translation suggestion "termes" and the second translation suggestion "teermes." Specifically, the first translation suggestion "termes" is shown as approved with 4 positive votes and the second translation suggestion "teermes" is shown with 2 negative votes.

Figures 1, 3G:
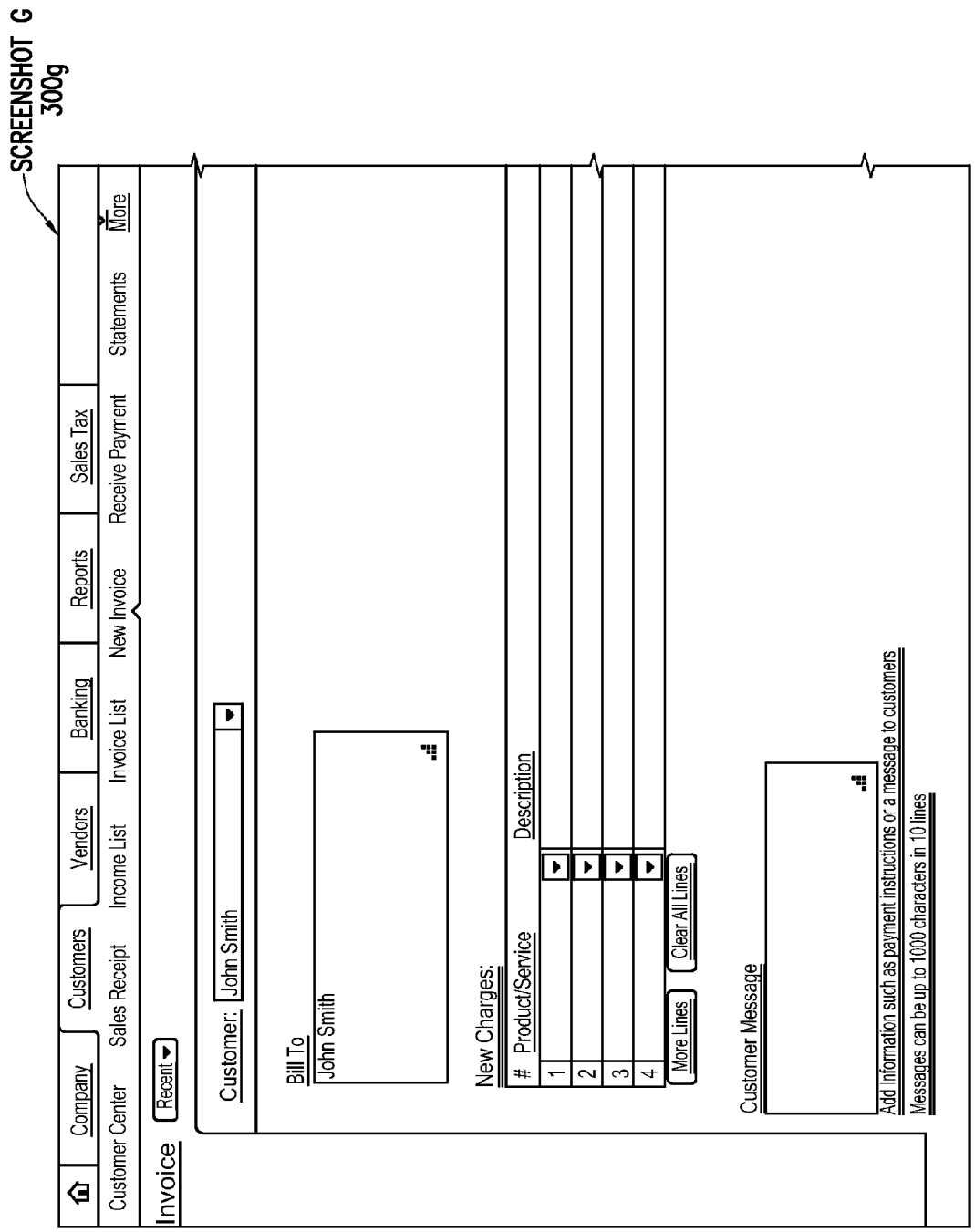
Figures 2, 3G:
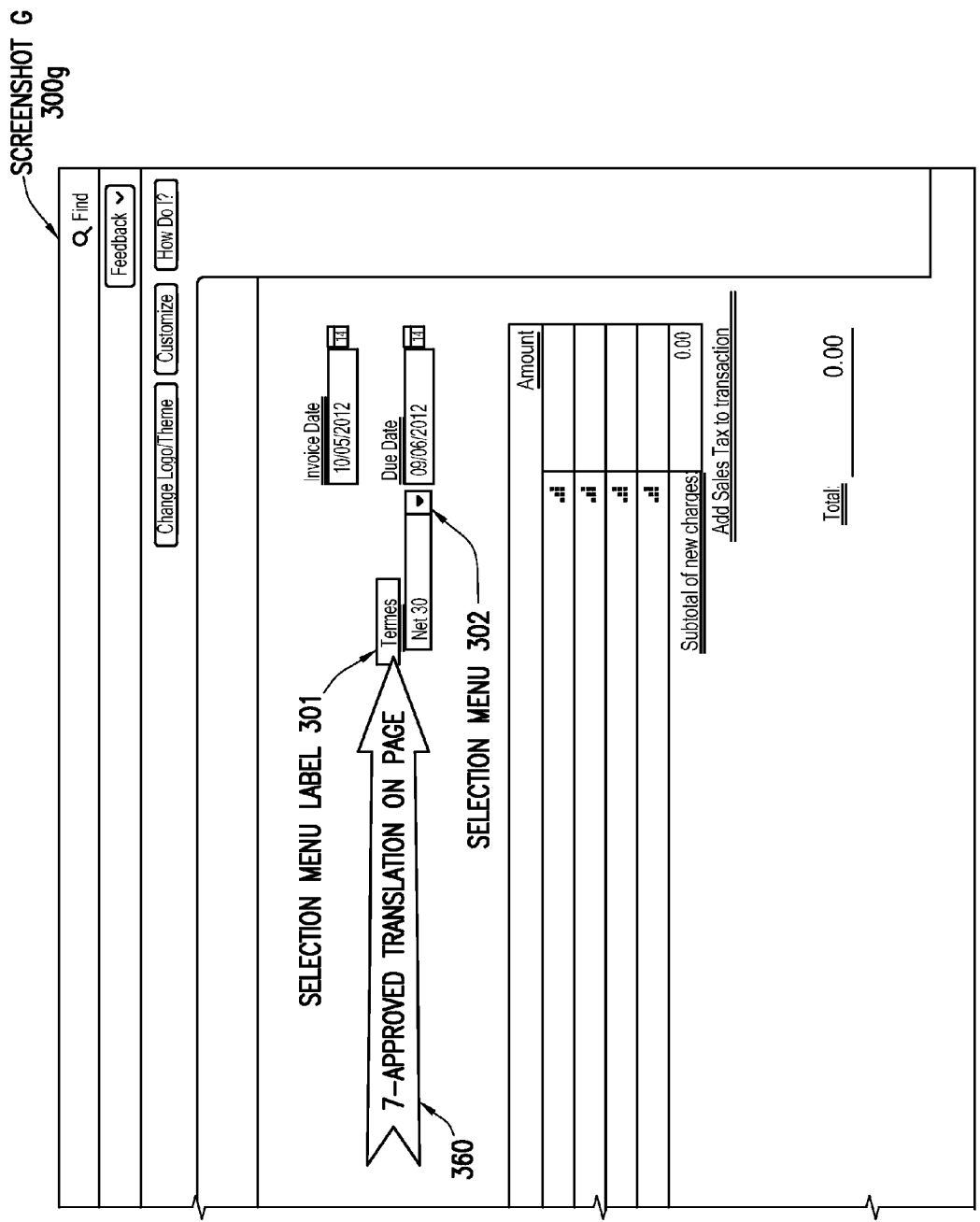

FIGS. 3G-1 and 3G-2 show a screenshot G (300g) of the same UI menu depicted in FIGS. 3A-1, 3A-2, 3B-1, 3B-2, 3D-1, 3D-2, and 3F after the approved translation is used to update the software application on each user device of user A, user B, and user C. Specifically, the software application is no longer in the French translation input mode and the selection menu label (301) now reads "termers," As indicated by the arrow (360) (for illustration only, not part of the screenshot G (300g)).

In summary, a user is allowed to suggest and/or vote on any localizable part of the software application UI, in a live interaction with the software application. As shown in the example workflow described above, the software application prompts the user with existing localization(s) with a localizable item where the user can vote for the most accurate translation among the existing choices. Alternatively, the user can enter his/her suggestion. When there is a minimum number of votes for a particular translation, that translation shows up in the localized version of the UI.

Although the examples shown in FIGS. 3A-1, 3A-2, 3B-1, 3B-2, 3C, 3D-1, 3D-2, 3E-1, 3E-2, 3F, 3G-1, and 3G-2 is based on a graphical UI, it is contemplated that the invention may also be applicable to other UI format, such as printed format, audio format, etc.

In another example, a central database is created to store localized terms that are categorized by ontology and contributing community. For example, the localized terms created for one application may then be used this for any other online applications. Example queries supported by the central database may include "Translate "Item" in the Ontology of Finance." In this example, item in Finance Ontology means a product/item to be sold for margin. Similarly, item in Tax Ontology means a row item for deduction.

Embodiments of the invention allow a user of a software application associated with an online or desktop product to translate a UI associated with the application in a live interaction with the product. Using such a platform, a company may be able to take its product to many geographies/regions in parallel, rather than localizing the application serially/sequentially, one geography at a time, thus reducing the time to market for the product globally and reducing the cost of localization of the product. More particularly, the proliferation of the product on a global scale is done via the community of local users of the product, i.e., using community feedback, thus creating a closed-loop self sustaining architecture.

Figure 4:
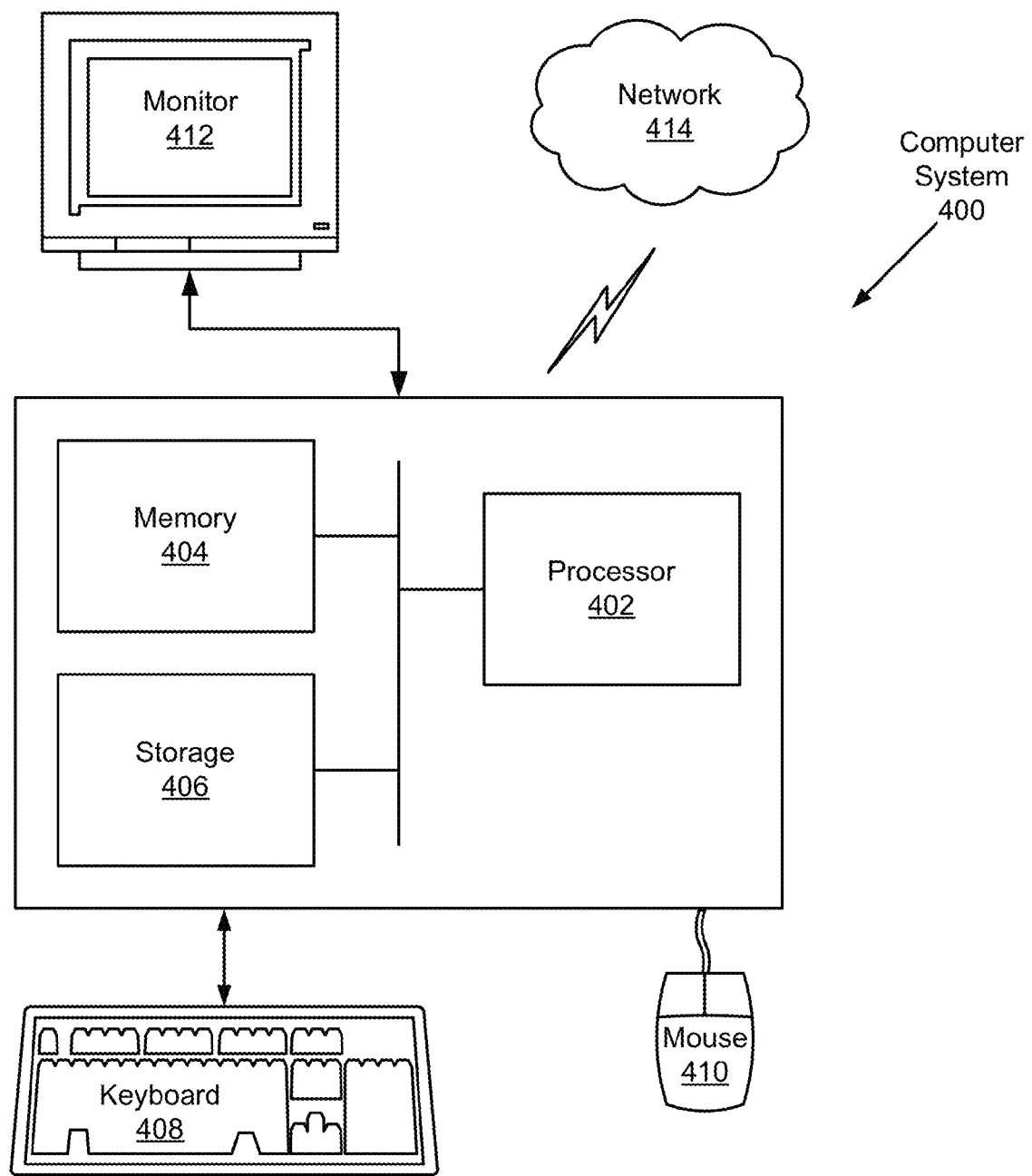
FIG. 4 shows a diagram of a computer system in accordance with one or more embodiments of the invention.

Embodiments of the invention may be implemented on virtually any type of computer regardless of the platform being used. For example, as shown in FIG. 4, a computer system (400) includes one or more processor(s) (402) such as a central processing unit (CPU), integrated circuit, or other hardware processor, associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor ((412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network)) with wired and/or wireless segments via a network interface connection (414). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a non-transitory computer readable storage medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to adapt a software application for a geographical region, comprising:
   selecting a predefined geographical region having a plurality of users that use the software application;
   receiving, by a computer processor and from at least one of the plurality of users, a first translation of a localizable item in a user interface (UI) menu of the software application, wherein the first translation is based on a language of the predefined geographical region;
   generating, by the computer processor, a tally of the first translation from the plurality of users;
   presenting, to one or more users from the plurality of users via a plurality of instantiations of the UI menu in response to the tally exceeding a pre-determined count, one or more requests for feedback regarding the accuracy of the first translation;
   receiving, from the one or more users from the plurality of users via the plurality of instantiations of the UI menu, the feedback;
   classifying, based on the feedback, the first translation as an approved translation of the localizable item; and
   when the first translation is classified as the approved translation, presenting to the plurality of users the localizable item in the UI menu using the first translation.

2. The method of claim 1, further comprising:
   including a first translation input field in the UI menu, wherein the first translation is received from the at least one of the plurality of users via the first translation input field presented in an instantiation of the plurality of instantiations of the UI menu.

3. The method of claim 1, further comprising:
   presenting, to the plurality of users via the plurality of instantiations of the UI menu, the localizable item using at least a second translation in addition to the first translation; and
   analyzing the feedback to determine at least a first level of agreement with the first translation and a second level of agreement with the second translation by the plurality of users,
   wherein the first translation is classified as the approved translation based at least on the first level of agreement exceeding the second level of agreement.

4. The method of claim 1, further comprising:
   presenting the feedback to an approver user; and
   receiving, in response to the presenting, an approval input from the approver user indicating that the first translation is approved,
   wherein the first translation is classified as the approved translation based at least on the approval input.

5. The method of claim 1, wherein the software application is an online application executing on the computer processor.

6. The method of claim 1, further comprising:
   receiving, by the computer processor, the first translation from a user device executing an instantiation of the software application,
   wherein the user submits the first translation via the UI menu of the instantiation.

7. The method of claim 1, further comprising:
   sending, by the computer processor, the first translation to a plurality of user devices executing a plurality of instantiations of the software application; and
   receiving, by the computer processor, the feedback from the plurality of user devices.

8. A system to adapt a software application for a geographical region, comprising:
   a computer processor configured to:
      select a predefined geographical region having a plurality of users that use the software application;
      receive, from at least one of the plurality of users, a first translation of a localizable item in a user interface (UI) menu of the software application, wherein the first translation is based on a language of the predefined geographical region;
      generate a tally of the first translation from the plurality of users; and
      classify, based on feedback regarding the accuracy of the first translation, the first translation as an approved translation of the localizable item;
   a plurality of user devices configured to:
      display a plurality of instantiations of the UI menu for the plurality of users;
      present, to one or more users from the plurality of users via the plurality of instantiations of the UI menu in response to the tally exceeding a pre-determined count, one or more requests for the feedback;
      receive, from the one or more users from the plurality of users via the plurality of instantiations of the UI menu, the feedback; and
      present, when the first translation is the approved translation, the localizable item in the UI menu using the first translation; and
   a repository configured to store the first translation and the feedback.

9. The system of claim 8,
   wherein the UI menu includes a first translation input field, and wherein the first translation is received from the at least one of the plurality of users via the first translation input field presented in an instantiation of the plurality of instantiations of the UI menu.

10. The system of claim 8,
wherein the plurality of user devices is further configured to present, to the plurality of users via the plurality of instantiations of the UI menu, the localizable item using at least a second translation in addition to the first translation,
wherein the computer processor is further configured to analyze the feedback to determine at least a first level of agreement with the first translation and a second level of agreement with the second translation by the second plurality of users, and
wherein the first translation is classified as the approved translation based at least on the first level of agreement exceeding the second level of agreement.

11. The system of claim 8, wherein the computer processor is further configured to:
present the feedback to an approver user; and
receive, in response to the presenting, an approval input from the approver user indicating that the first translation is approved,
wherein the first translation is classified as the approved translation based at least on the approval input.

12. The system of claim 8,
wherein the computer processor is further configured to execute the software application as an online application.

13. The system of claim 8,
wherein the plurality of user devices are further configured to execute a plurality of instantiations of the software application,
wherein the computer processor is further configured to receive the first translation from at least one of the user device, and
wherein the user submits the first translation via the UI menu in at least one of the plurality of instantiation of the software application executing on the at least one user device.

14. The system of claim 8,
wherein the plurality of user devices are further configured to execute a plurality of instantiations of the software application,
wherein the computer processor is further configured to:
send the first translation to the plurality of user devices; and
receive the feedback from the plurality of user devices.

15. A non-transitory computer readable medium storing instructions to adapt a software application for a geographical region, the instructions, when executed by a computer processor, comprising functionality for:
selecting a predefined geographical region having a plurality of users that use the software application
receiving, from at least one of the plurality of users, a first translation of a localizable item in a user interface (UI) menu of the software application, wherein the first translation is based on a language of the predefined geographical region;
generating a tally of the first translation from the plurality of users;
presenting, to one or more users from the plurality of users via a plurality of instantiations of the UI menu in response to the tally exceeding a pre-determined count, one or more requests for feedback regarding the accuracy of the first translation;
receiving, from the one or more users from the plurality of users via the plurality of instantiations of the UI menu, the feedback;
classifying, based on the feedback, the first translation as an approved translation of the localizable item; and
when the first translation is classified as the approved translation, presenting to the plurality of users the localizable item in the UI menu using the first translation.

16. The non-transitory computer readable medium of claim 15, the instructions, when executed by the computer processor, further comprising functionality for:
including a first translation input field in the UI menu, wherein the first translation is received from the at least one of the plurality of users via the first translation input field presented in an instantiation of the plurality of instantiations of the UI menu.

17. The non-transitory computer readable medium of claim 15, the instructions, when executed by the computer processor, further comprising functionality for:
presenting, to the plurality of users via the plurality of instantiations of the UI menu, the localizable item using at least a second translation in addition to the first translation; and
analyzing the feedback to determine at least a first level of agreement with the first translation and a second level of agreement with the second translation by the plurality of users,
wherein the first translation is classified as the approved translation based at least on the first level of agreement exceeding the second level of agreement.

18. The non-transitory computer readable medium of claim 15, the instructions, when executed by the computer processor, further comprising functionality for:
presenting the feedback to an approver user; and
receiving, in response to the presenting, an approval input from the approver user indicating that the first translation is approved,
wherein the first translation is classified as the approved translation based at least on the approval input.

19. The non-transitory computer readable medium of claim 15, wherein the software application is an online application executing on the computer processor.

20. The non-transitory computer readable medium of claim 15, the instructions, when executed by the computer processor, further comprising functionality for:
receiving, by the computer processor, the first translation from a user device executing an instantiation of the software application,
wherein the user submits the first translation via the UI menu of the instantiation.

21. The non-transitory computer readable medium of claim 15, the instructions, when executed by the computer processor, further comprising functionality for:
sending, by the computer processor, the first translation to a plurality of user devices executing a plurality of instantiations of the software application; and
receiving, by the computer processor, the feedback from the plurality of user devices.

* * * * *